United States Patent
Sawada et al.

(10) Patent No.: US 6,920,696 B2
(45) Date of Patent: Jul. 26, 2005

(54) MICROSCOPIC POSITIONING DEVICE AND TOOL POSITION/ORIENTATION COMPENSATING METHOD

(75) Inventors: Kiyoshi Sawada, Shizuoka (JP); Kenzo Ebihara, Yamanashi (JP); Yasuhiro Sakaida, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/853,140

(22) Filed: May 26, 2004

(65) Prior Publication Data

US 2004/0244208 A1 Dec. 9, 2004

(30) Foreign Application Priority Data

Jun. 5, 2003 (JP) ........................ 2003-160308

(51) Int. Cl.⁷ .............................. G01B 5/00; B23Q 3/18
(52) U.S. Cl. ........................... 33/1 M; 33/1 N; 33/568; 977/DIG. 1
(58) Field of Search ................. 33/1 M, 1 N, 568–570; 977/DIG. 1

(56) References Cited

U.S. PATENT DOCUMENTS

| | | | | |
|---|---|---|---|---|
| 4,520,570 A | * | 6/1985 | Bednorz et al. | 33/613 |
| 4,575,942 A | * | 3/1986 | Moriyama | 33/1 M |
| 4,888,878 A | * | 12/1989 | Nagasawa et al. | 33/573 |
| 5,005,298 A | * | 4/1991 | Nagasawa et al. | 33/573 |
| 5,280,677 A | * | 1/1994 | Kubo et al. | 33/568 |
| 5,351,412 A | * | 10/1994 | Furuhata et al. | 33/568 |
| 5,709,802 A | * | 1/1998 | Furuhata et al. | 33/1 M |
| 6,467,761 B1 | * | 10/2002 | Amatucci et al. | 33/568 |
| 6,513,250 B2 | * | 2/2003 | Sin | 33/1 M |
| 6,839,970 B2 | * | 1/2005 | Montesanti et al. | 33/1 M |
| 2002/0004991 A1 | * | 1/2002 | Sin | 33/1 M |
| 2004/0177520 A1 | * | 9/2004 | Nakamura et al. | 33/1 M |

FOREIGN PATENT DOCUMENTS

JP        7-299700        11/1995

\* cited by examiner

*Primary Examiner*—Christopher W. Fulton
*Assistant Examiner*—Yaritza Guadalupe
(74) *Attorney, Agent, or Firm*—Staas & Halsey LLP

(57) ABSTRACT

A microscopic positioning device having machine rigidity and being capable of achieving nano-order positioning accuracy and a method of compensating tool position and orientation. A driving unit comprises two piezoelectric elements P1 and P2 arranged into alignment along an expanding/shrinking direction. Both ends of the piezoelectric element P1, facing in the expanding/shrinking direction, are fixed to a base member and a movable member, respectively. The other piezoelectric element P2 is fixed to the base member only at one end. A gap L is formed between the piezoelectric element P2 and the movable member. Where expanding displacement amounts of the piezoelectric elements P1 and P2 are a1 and a2, respectively, voltage applied to the piezoelectric elements P1 and P2 is so controlled to satisfy an equation, a1+a2=a≧L. It is possible to position the movable member at a position within a maximum stroke a in the nano-order. The driving units may be arranged in the orthogonal directions, thereby providing the positioning device with two degrees of freedom, and further providing six degrees of freedom including rotation axes.

6 Claims, 7 Drawing Sheets

MICROSCOPIC POSITIONING DEVICE AND TOOL POSITION/ORIENTATION COMPENSATING METHOD

BACKGROUND OF THE INVENTION

1. Field of the Invention

The present invention relates to a microscopic positioning device using piezoelectric elements and a tool position and orientation-compensating method using the microscopic positioning device.

2. Description of the Related Art

In a machine tool, when the blade edge of a tool is deviated from the intended position and orientation, the deviation amount directly affects the accuracy of form of a processed object. Especially when performing the ultra-precision machining of a free-form surface, even a micron-order error of the blade edge cannot be neglected as a machining error. In general, the position and orientation of the tool are compensated by an adjustment mechanism, such as a micrometer, after estimating a necessary compensation amount through a method for inferring how much and in what direction the tool is deviated on the basis of an actual machining result and a method for measuring distance between a benchmark and the tool blade edge by using a microscope and a displacement sensor.

Although the micrometer is capable of making a micron-order error adjustment, the improvement of accuracy of measuring devices made it possible to estimate the deviation amount of the tool to nano-order resolution, based on machining results of the work. Therefore, it is desired that the tool position and orientation be compensated by the nano-order adjustment. In general, a piezoelectric element, which expands according to the level of an applied voltage, is commonly utilized as an actuator for positioning a micro-stroke of several to several dozen microns in the nano-order.

Known as such a device with high accuracy is the one in which a spindle unit is fixed through an RCC (remote center compliance) mechanism to a Z-axis table that is driven in a Z-axis direction by a screw delivery mechanism. In the RCC mechanism, four piezoelectric elements are arranged in a circumferential direction. By expanding/shrinking these piezoelectric elements, the inclination of the spindle unit is adjusted, to thereby accurately control the position and orientation of the tool (JP 7-299700A).

In order to achieve one nanometer resolution in a rotating motor and a linear motor, a precision and complicated machine configuration is required. As for the piezoelectric element, on the contrary, as long as the applied voltage is controlled, one nanometer resolution can be achieved relatively easily. For instance, in the case of a piezoelectric element which expands by 10 microns in response to a voltage of 100 volts, one nanometer resolution can be achieved by changing the voltage with 10-millivolt resolution. Consequently, a position adjustment in nanometer unit is made without difficulty.

Depending on the machining, there are differences in directions in which the compensation of the tool position and orientation has to be made. In consideration of every machining, however, there needs to be a mechanism capable of carrying out an orthogonal three-axis and rotational three-axis six-degree-of-freedom adjustment to arbitrarily compensate both the position and orientation of the tool. However, since a one-degree-of-freedom configuration can be considered to form a single spring system, six degrees of freedom are accordingly considered to comprise six springs jointed in series. Such a multidegree-of-freedom configuration is then weak in machine rigidity. There is no point in compensating the tool position and orientation in the nano-order if the machine configuration becomes weak. Therefore, the securement of machine rigidity is important.

Although the piezoelectric element is highly resistant to an external force acting in a compressing direction, it is easily affected by an external force acting in an expanding direction. The piezoelectric element that is commonly utilized is a laminated one with a configuration in which a large number of thin elements having a piezoelectric effect are superimposed on one another. The elements are simply united to one another through thin adhesive layers. Therefore, if the elements are applied with a force acting in a pulling direction, the adhesive layers come unstuck, resulting in damage. In other words, if the piezoelectric elements are incorporated into a structural body, the structural body becomes weak in rigidity depending on directions in which the piezoelectric elements are arranged.

The above problem can be solved if only the configuration is formed such that the external force constantly acts in a direction of compressing the piezoelectric elements. For instance, in the case of a positioning device having a movable part for performing a relative displacement with respect to a base and positioning the movable part, two piezoelectric elements are utilized, and one-side ends of both piezoelectric elements are fixed onto two respective opposite faces of the movable part into alignment, while the other-side ends of the piezoelectric elements are each fixed to the base. With such a configuration, even if the movable part is applied with the external force acting in the direction of expanding one of the piezoelectric elements, the force acts in the direction of compressing the other piezoelectric element without fail. For this reason, the piezoelectric element which is compressed can resist the external force with high rigidity.

The above-mentioned configuration, however, has a problem. Because of its polarity, the piezoelectric element is basically displaced only in the expanding direction. Therefore, if both ends of each of the piezoelectric elements are fixed as described above in a state where no voltage is applied to the piezoelectric elements, one of the piezoelectric elements must be displaced in the compressing direction, while the other in the expanding direction, in order to displace the movable part. However, the piezoelectric element cannot be displaced in the compressing direction. To solve this problem, if both the ends are fixed in the same manner taking the displacement of half the maximum displacement amount as a neutral point, the movable part can be displaced by expanding/shrinking the two piezoelectric elements in opposite directions. If the applied voltage is turned to 0 volt, however, the piezoelectric elements are both compressed, and the piezoelectric elements themselves are destroyed, so that the power source is required not to be turned off. For this reason, the configuration in which two piezoelectric elements are arranged in the movable part to be opposed to each other as described above has not been applied in prior art.

SUMMARY OF THE INVENTION

The present invention provides a microscopic positioning device having machine rigidity and being capable of achieving nano-order positioning accuracy and a method of compensating a position and/or an orientation of a tool using the microscopic positioning device.

A microscopic positioning device of the present invention comprises: a base member having first and second abutting faces; a movable member having first and second abutting faces; and at least one driving unit for driving the movable member to be positioned with respect to the base member, including a first piezoelectric element and a second piezoelectric element arranged along a straight line on which expanding/shrinking directions thereof are aligned, one end and the other end of the first piezoelectric element in the expanding/shrinking direction being fixed to the first abutting faces of the base member and the movable member, respectively, and one end of the second piezoelectric element in the expanding/shrinking direction being fixed to one of the second abutting faces of the base member and the movable member, and the other end of the second piezoelectric element being confronting the other of the second abutting faces of the base member and the movable member with a gap in between in unenergized states of the first and second piezoelectric elements.

The gap between the other end of the second piezoelectric element and the second abutting face of the movable member or the base member is determined within a range in which the other end of the second piezoelectric element is brought into contact with the other of the second abutting faces of the movable member and the base member when at least one of the first and second piezoelectric elements are energized, so that the other end of the second piezoelectric element is pressed against the other of the second abutting faces to achieve mechanical rigidity. With the above arrangement, the movable member is moved to be positioned with respect to the base member by energizing the first and second piezoelectric elements to expand in the opposite directions. Furthermore, when the power is turned off to de-energize the first and second piezoelectric elements to be shrink, the movable member is simply drawn by the first piezoelectric element with one end and the other end fixed, and the first and second piezoelectric elements are never pulled by each other.

One or more driving units may be provided for one of perpendicular directions such that the straight lines on which the expanding/shrinking directions of the piezoelectric elements of respective driving units are aligned extend perpendicular to each other, thereby the movable member is driven with respect to the base member in the perpendicular directions.

Four driving units may be provided along four sides of a rectangle to drive and position a single movable member with respect to a single base member, thereby providing degrees of freedom along perpendicular two axes and around one rotational axis.

The microscopic positioning device may further comprise an additional piezoelectric element disposed at each of four corners of the rectangle so that an expanding/shrinking direction of the additional piezoelectric element extends in a direction perpendicular to a plane of the rectangle, and one end and the other end of the additional piezoelectric element are fixed to the base member and the movable member, respectively, to provide additional three degrees of freedom along one translating axis and around two rotational axes.

The microscopic positioning device may further comprise a micrometer for performing a coarse positioning of the base member along a coarse adjustment axis in the same direction as the expanding/shrinking directions of the piezoelectric elements of at least one of the driving units.

The present invention also provides a method of compensating a position and/or an orientation of a blade edge of a tool in a nano-order using the microscopic positioning device as described.

DETAILED DESCRIPTION

Figure 1:
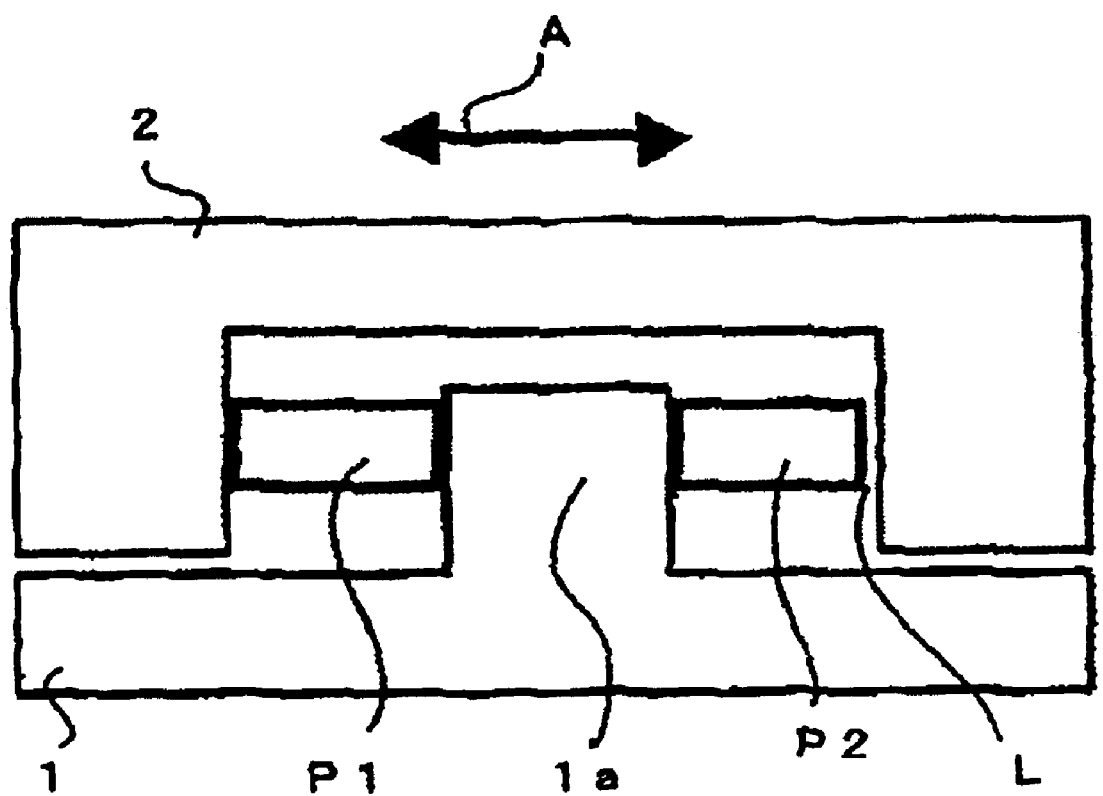
FIG. 1 is a schematic view of a substantial part of a first embodiment of the present invention.

FIG. 1 is a schematic view of a substantial part of a first embodiment of the present invention. The first embodiment relates to a one-axis microscopic positioning device. The microscopic positioning device causes a movable member 2 to move in one linear direction with respect to a base member 1 and positions the movable member 2 with respect to the base member 1. The movable member 2 is moved in a direction shown by an arrow A of FIG. 1 by a driving unit comprising two piezoelectric elements P1 and P2 which expand by being applied with voltage as driving means of the movable member 2.

The base member 1 is provided with abutting faces on opposite sides of a projecting portion 1a at the center thereof. The movable member 2 is provided at both ends with abutting faces being opposed to respective abutting faces of the projecting portion 1a of the base member 1 with respective gaps in between. Both the ends of the piezoelectric element P1, which face in an axial direction, are fixed onto the abutting face of the projecting portion 1a of the base member 1 and the abutting face of the movable member 2, respectively. One of the ends of the piezoelectric element P2, which face in the axial direction, is fixed onto the other abutting face of the projecting portion 1a of the base member 1, while the other end is not fixed. In the embodiment shown in FIG. 1, the left end of the piezoelectric element P2 is fixed to the base member 1, but the right end is not fixed, thereby serving as a free end. In unenergized states where no voltage is applied to the piezoelectric elements P1 and P2t, there is a gap of distance L between the right end face of the piezoelectric element P2 and the surface of the movable movable member 2.

When the piezoelectric elements P1 and P2 are applied with voltage, the distance between the two axial end faces is increased. Where a maximum displacement amount of the piezoelectric elements P1 and P2 is "a", when a displacement amount of each of the piezoelectric elements P1 and P2 is a/2, a condition that the end face of the piezoelectric element P2 contacts the movable member 2 is L≦a. The displacement amount "a" is generally a value in the range of from about 10 to 30 µm. On this condition, if the displacement amounts of the piezoelectric elements P1 and P2 are so controlled as to satisfy an equation, a1+a2=a, where a1 represents the displacement amount of the piezoelectric element P1, and a2 represents that of the piezoelectric element P2, the movable member 2 can be displaced in the axial direction of the piezoelectric elements P1 and P2 at the same stroke as the maximum displacement amount a of the piezoelectric elements P1 and P2 while the movable member 2 is applied with a constant pushing pressure from the piezoelectric elements P1 and P2.

For instance, if voltage is applied to only the piezoelectric element P2 to displace the piezoelectric element P2 merely by the maximum displacement amount a, the movable member 2 is not shifted but pressed by the piezoelectric elements P1 and P2, thereby maintaining the rigidity. On the contrary, if voltage is applied to only the piezoelectric element P1 to displace the piezoelectric element P1 merely by the maximum displacement amount a, the movable member 2 is displaced only by the displacement amount a in a leftward direction facing into FIG. 1. In this case, the rigidity of the movable member 2 is maintained due to the pushing pressure of the piezoelectric elements P1 and P2. Moreover, if the piezoelectric element P1 is applied with voltage so as to be displaced only by a displacement amount (a−δ), and if the piezoelectric element P2 is applied with voltage so as to be displaced only by a displacement amount δ, the movable member 2 is displaced only by (a−δ), and the piezoelectric element P2 is expanded only by the displacement amount δ, which eliminates the gap distance L. Accordingly, the movable member 2 can maintain the rigidity due to the pushing pressure of the piezoelectric elements P1 and P2. In this way, it is possible to position the movable member 2 at an arbitrary position while retaining the rigidity within the range of the maximum stroke a. In addition, as stated above, the piezoelectric elements P1 and P2 of the driving unit can be expanded with nano-order resolution by controlling the applied voltage, thereby obtaining the positioning device with high accuracy.

The pushing pressure is even zero on condition that L=a. The smaller than the displacement amount a the gap distance L is, the more the pushing pressure is, and the machine rigidity is accordingly increased. From a practical standpoint, however, the distance L is sufficient if only it is 1 µm smaller than the displacement amount a. Although the piezoelectric element P2 is fixed to the base member 1 in FIG. 1, even if the piezoelectric element P2 is fixed to the movable member 2 and separated from the base member 1 with the gap distance L therebetween, the same configuration is achieved.

The axial length of the piezoelectric element P1 does not have to be identical to that of the piezoelectric element P2. That is, a distance between one side face of the projecting portion 1a of the base member 1 and the opposed face of the movable member 2 may not be the same as a distance between the other side face of the projecting portion 1a and the opposed face of the movable member 2. The gap L may be formed either between the end face of one of the piezoelectric elements and the face of the movable member 2 or between the end face of one of the piezoelectric elements and the side face of the projecting portion 1a of the base member 1 in the state where the piezoelectric elements P1 and P2 are not applied with voltage. Referring to FIG. 1, for instance, the piezoelectric element P2 has only to expand by the gap distance L or more and to have the displacement amount a of a minimum value which is sufficient to press the movable member 2 with a given pressure. The piezoelectric element P2 is simply required to control the applied voltage so that the displacement amount becomes equal to or less than the displacement amount a. Additionally, the piezoelectric element P1 is only required to control the applied voltage so that the displacement amount becomes equal to or less than the displacement amount a even if having a displacement amount equal to or more than the displacement amount a. Furthermore, the maximum displacement amount of the piezoelectric element P1 determines the maximum stroke of the movable member 2.

Figure 2:
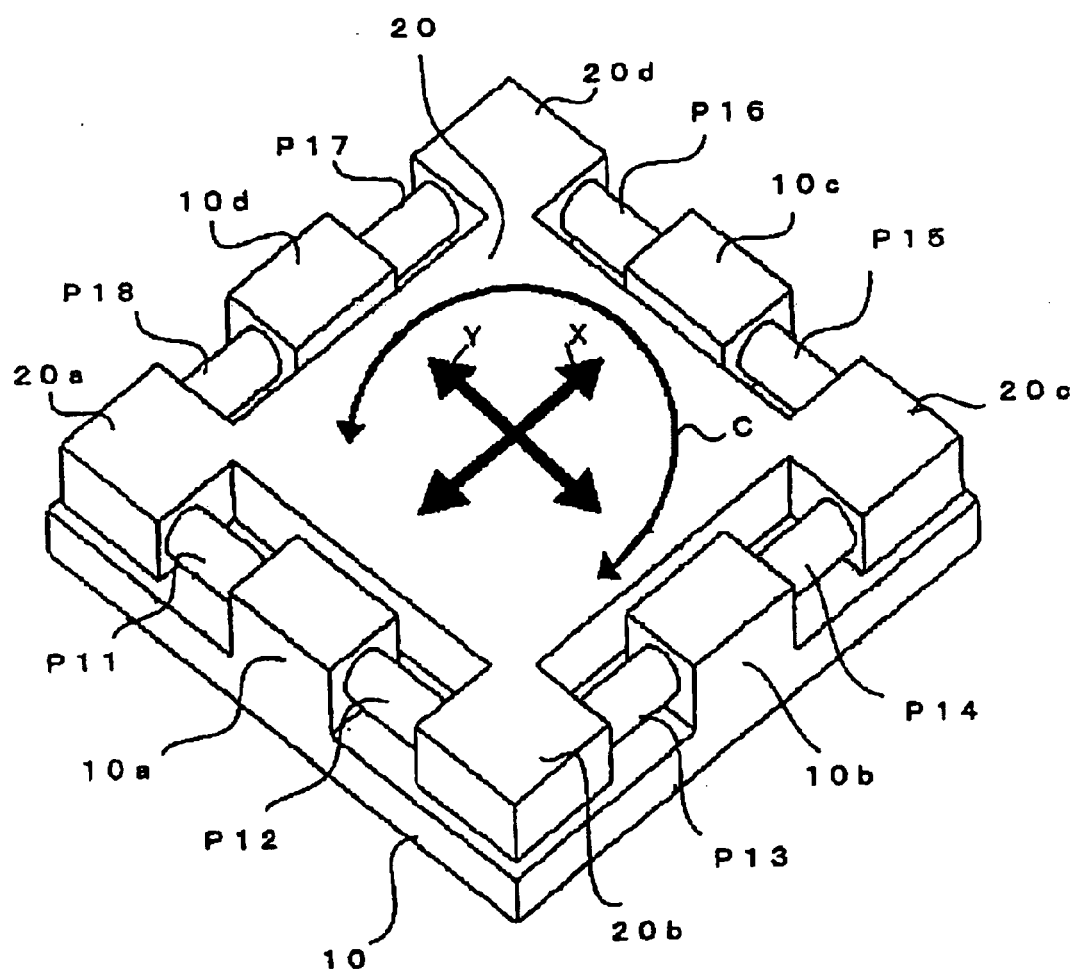
FIG. 2 is a schematic view of a substantial part of a second embodiment of the present invention.

FIG. 2 is a schematic view of a substantial part of a second embodiment according to the present invention. There is formed a microscopic positioning device having translational two-axis and rotational one-axis, namely three-axis, degree of freedom, by combining four structures of the one-axis microscopic positioning device shown in FIG. 1, that is, four driving units each including two piezoelectric elements.

According to the second embodiment, in each of four sides of the base member formed in the rectangular or square shape, there is provided a configuration of the one-axis microscopic positioning device illustrated in FIG. 1, in which the movable member 20 is shifted in a linear direction of each side. The base member 10 is provided with projecting portions 10a, 10b, 10c and 10d in middle portions of the respective sides thereof. The movable member 20 has opposed face portions 20a, 20b, 20c and 20d at four corners thereof, which include surfaces opposed to respective side faces of the projecting portions 10a, 10b, 10c and 10d with gaps in between. In each side, a pair of piezoelectric elements P11 and P12, P13 and P14, P15 and P16, and P17 and P18 serving as driving units are disposed between the projecting portions 10a, 10b, 10c and 10d of the base member 10 and the opposed face portions 20a, 20b, 20c and 20d of the movable member, respectively, in a linear direction of each side. Both ends of one of the piezoelectric elements of each driving unit are fixed to the projecting portion of the base member 10 and the opposed face portion of the movable member. The other piezoelectric element is fixed to either the projecting portion or the opposed face portion only at one end, and the other end is not fixed to serve as a free end. In the embodiment illustrated in FIG. 2, the piezoelectric elements P11, P13, P16 and P18 are fixed at respective both ends, whereas the piezoelectric elements P12, P14, P15 and P17 are fixed at respective one ends, and the other ends form gaps having the distance L in consort with the projecting portions of the base member or the opposed face portions of the movable member.

As described above, there is provided the microscopic positioning device in which four configurations of the one-axis microscopic positioning device shown in FIG. 1, the device being capable of performing the positioning by causing the movable member 20 to move linearly and rotate in an X-axis direction serving as a linear axis, a Y-axis direction orthogonal to the X-axis direction and a C-axis direction serving as a rotation axis, which are indicated by arrows in FIG. 2.

On the condition that displacement amounts of the piezoelectric elements P11 through P18 are a11 through a18, respectively, the movable member 20 is located at the center of the base member 10 and pressed by a given pushing pressure due to each of the piezoelectric elements P11 through P18, where a11 through a18=a/2. For example, in case that the movable member 20 is displaced from the center of the base member 10 only by a/2 in the Y-axis direction of FIG. 2, since the piezoelectric elements P13, P14, P17 and P18, which are located so that respective axes are parallel to the X-axis direction orthogonal to the Y-axis direction, maintain the X-axis directional position of the movable member 20 at the center of the base member 10, voltage is so applied that the displacement amounts satisfy an equation, a13=a14=a17=a 18=a/2.

At the same time, voltage is so applied that the piezoelectric elements P11 and P16, which are located so that respective axes are parallel to the Y-axis direction, have respective displacement amounts satisfying an equation, a11=a16=0, and that the piezoelectric elements P12 and P15 have those satisfying an equation, a12=a15=a. By doing so, the movable member 20 is moved in the downward and rightward direction along the Y-axis direction, facing into FIG. 2.

When the movable member 20 is to be shifted in the inverse direction (upward and leftward direction facing into FIG. 2) to the Y-axis direction, voltage is applied to the piezoelectric elements such that the piezoelectric elements P13, P14, P17 and P18 have respective displacement amounts satisfying an equation, a13=a14=a17=a18=a/2, that the piezoelectric elements P11 and P16 have those satisfying an equation, a11=a16=a, and that the piezoelectric elements P12 and P15 have those satisfying an equation, a12=a15=0.

Figure 3:
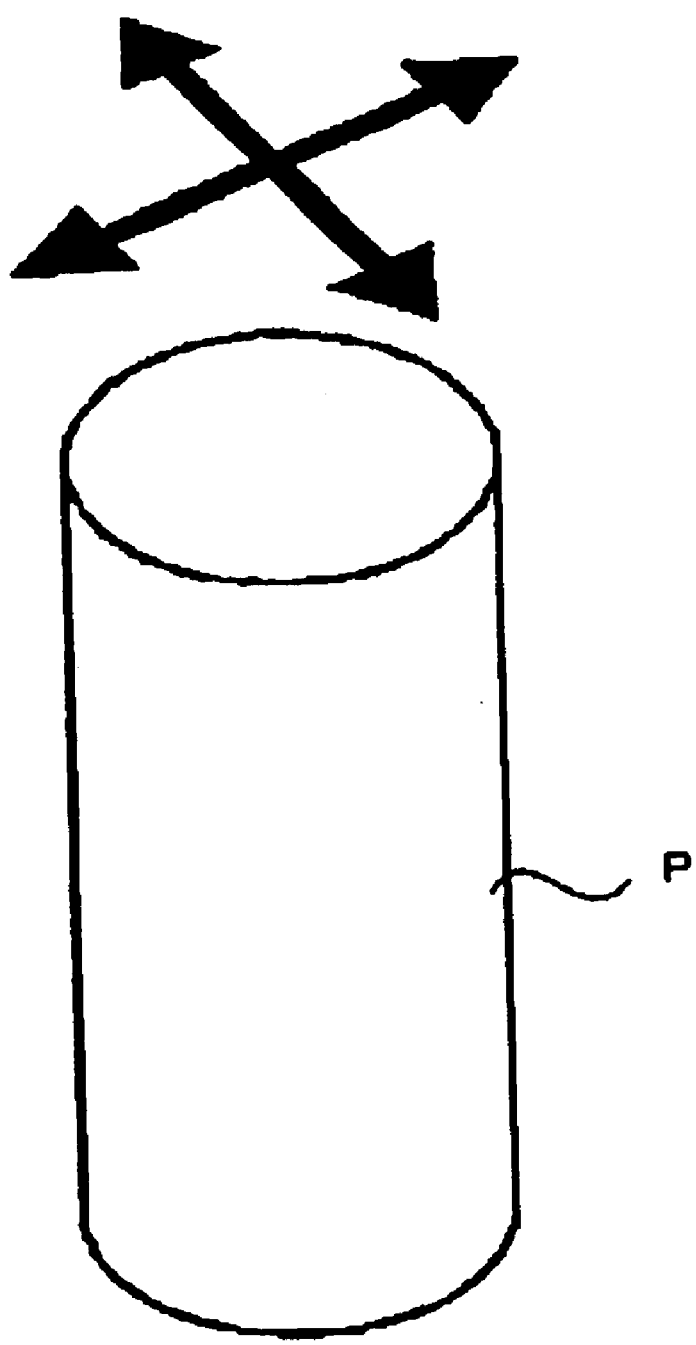
FIG. 3 is an explanatory view of rigidity of a piezoelectric element.

Herein, since the piezoelectric elements P13, P14, P17 and P18 are located in the direction orthogonal to the direction in which the movable member 20 is to be displaced, it appears that the piezoelectric elements P13, P14, P17 and P18 hinder the displacement of the movable member 20. On the contrary, the piezoelectric elements P have small rigidity against forces acting orthogonally to the axial directions as indicated by arrows in FIG. 3, so that the piezoelectric elements P do not counteract the displacement of the movable member 20.

When the movable member 20 is to be moved in the X-axis direction, voltage is applied to the piezoelectric elements such that the piezoelectric elements P11, P12, P15 and P16 have respective displacement amounts satisfying an equation, a11=a12=a15=a16=a/2, that the piezoelectric elements P13 and P18 have those satisfying an equation, a13=a18=0, and that the piezoelectric elements P14 and P17 have those satisfying an equation, a14=a17=a. As a result, the movable member 20 is moved in the upward and rightward direction along the X axis, facing into FIG. 2. Furthermore, the movable member 20 is shifted in the downward and leftward direction along the X axis, facing into FIG. 2, if voltage is applied to the piezoelectric elements such that the piezoelectric elements P11, P12, P15 and P16 have respective displacement amounts satisfying an equation, a11=a12=a15=a16=a/2, that the piezoelectric elements P13 and P18 have those satisfying an equation, a13=a18=a, and that the piezoelectric elements P14 and P17 have those satisfying an equation, a14=a17=0.

In cases where the movable member is displaced in a rotating direction of the C axis, for example, if the displacement amounts of the piezoelectric elements P11, P13, P15 and P17 are set to satisfy an equation, a11=a13=a15=a17=a, and if the displacement amounts of the piezoelectric elements P12, P14, P16 and P18 are set to satisfy an equation, a12=a14=a16=a18=0, the movable member 20 is displaced clockwise in the C-axis direction. On the contrary, if the piezoelectric elements P11, P13, P15 and P17 are set to have respective displacement amounts satisfying an equation, a11=a13=a15=a17=0, and if piezoelectric elements P12, P14, P16 and P18 are determined to have respective displacement amounts satisfying an equation, a12=a14=a16=a18=a, the movable member 20 is displaced in counterclockwise in the C-axis direction.

The above explanation describes the embodiment in which the piezoelectric elements are shifted by displacement amounts 0, a/2, and a. According to this embodiment, by moving the piezoelectric elements by the displacement amounts in the range of from 0 to a, the movable member 20 can be displaced in the X-axis and Y-axis directions and in the C-axis rotating direction to be positioned at a position in the range of from 0 to a.

When the power is off, the movable member 20 is fixed to the base member 10 through one of the piezoelectric elements in pair located in each of the four sides of the base member 10. When the power is on, the movable member 20 is fixed to the base member 10 by being pressed by the piezoelectric elements located in the respective sides. Therefore, the rigidity is maintained in spite of three degrees of freedom.

Figure 4:
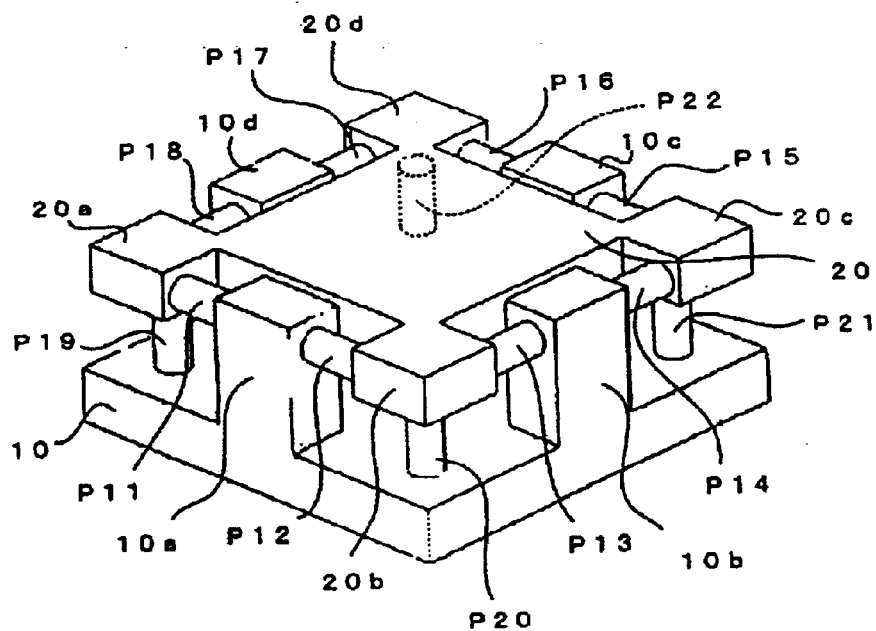
FIG. 4 is a schematic view of a substantial part of a third embodiment of the present invention.

FIG. 4 is a schematic view of a substantial part of a third embodiment of the present invention. The microscopic positioning device according to the third embodiment is formed by adding four piezoelectric elements to the three-axis configuration of the second embodiment illustrated in FIG. 2 and has translational three-axis and rotational three-axis, namely six-axis, degree of freedom.

The piezoelectric elements 11 through 18 are fixed to the base member 10 and the movable member 20 by the same method as the three-axis microscopic positioning device of FIG. 2, that is, the method shown in FIG. 1. According to the third embodiment, piezoelectric elements P19, P20, P21 and P22 are disposed between the base member 10 and the opposed face portions 20a, 20b, 20c and 20d of the movable member 20, respectively, such that respective axes are parallel to the direction (hereinafter referred to as a Z-axis direction) orthogonal to the X-axis and Y-axis directions, with respective both ends fixed to the base member 10 and the movable member 20. According to the present invention, a method of fixing the piezoelectric elements, which heightens the rigidity of the microscopic positioning device, is the fixing method indicated in FIG. 1 in principle. This fixing method shown in FIG. 1, however, is not applied to the piezoelectric elements located such that the respective axes are arranged in the Z-axis direction. A reason is that the piezoelectric elements P19 through P22 support the movable member 20 in the vertical direction, or gravitational direction, and a gravitational external force constantly acts in a direction of pushing the movable member downward, which is a direction of compressing the piezoelectric elements P19 through P22. The piezoelectric elements have high rigidity with respect to such a direction, so that it is unlikely that there generates an upward external force against gravity. Consequently, the fixing method of the piezoelectric elements supporting the movable member in one direction is applied. The method is applied to a positioning device which positions the movable member constantly applied with a load compressing the piezoelectric elements P19 through P22 even if the Z-axis direction is not the gravitational direction.

The directions of driving the movable member 20 using the piezoelectric elements P11 through P18 are the same as those (X-, Y-, and C-axis directions) indicated in FIG. 2.

Figure 5:
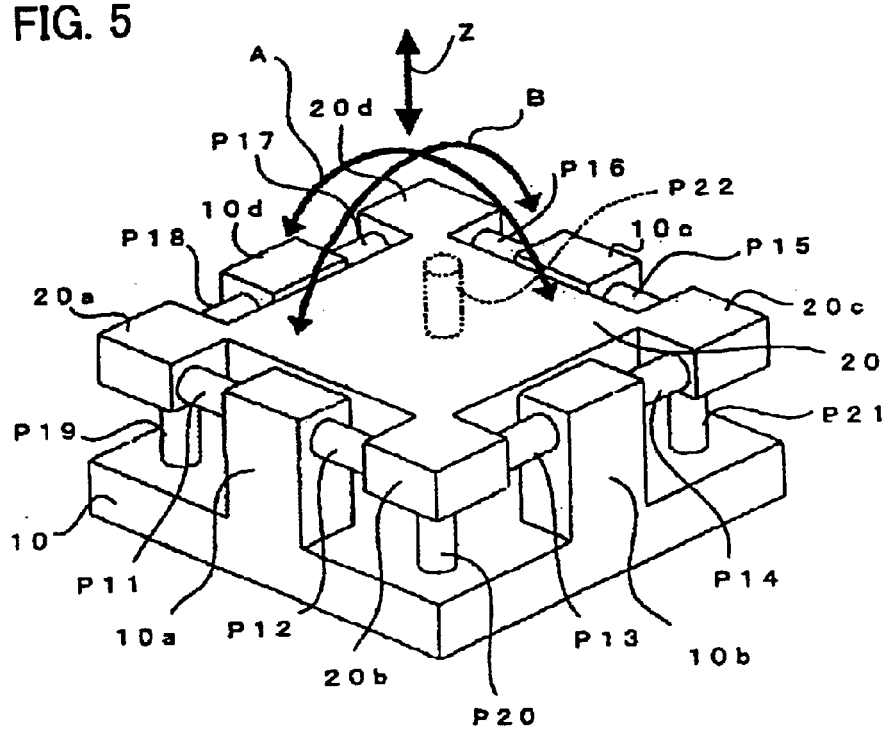
FIG. 5 is an explanatory view of operation of the third embodiment.

The directions of driving the movable member 20 using the piezoelectric elements P9 through P12 are translational one-axis and rotational two-axis, namely three-axis, directions, which are a translational Z-axis direction and rotational A- and B-axis directions as indicated by arrows in FIG. 5. In case that the movable member 20 is to be shifted in the Z-axis direction, if the piezoelectric elements P19 through P22 are arbitrarily displaced on the condition that a19=a20=a21=a22, where a19 through a22 denote displacement amounts of the piezoelectric elements P19 through P22, the movable member 20 moves in the Z-axis direction. Moreover, for instance, when the movable member 20 is to be rotated (inclined) in the A-axis direction, if the piezoelectric elements P19 through P22 are arbitrarily displaced on the condition that the displacement amount a19=a22 and that the displacement amount a20=a21, the movable member 20 shifts in the A-axis direction. In addition, the movable member 20 moves in the B-axis direction by arbitrarily displacing the piezoelectric elements P19 through P22 on the condition that the displacement amount a19=a20 and that the displacement amount a21=a22.

Figure 6:
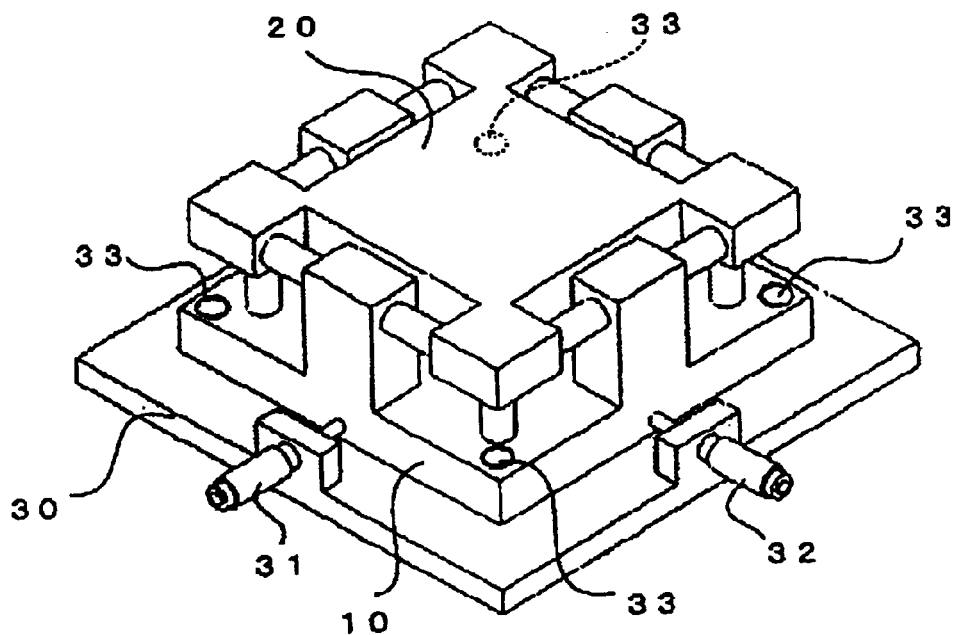
FIG. 6 is a schematic view of a substantial part of a fourth embodiment of the present invention.

FIG. 6 shows the six-axis microscopic positioning device of the third embodiment illustrated in FIG. 4, to which micrometers of two axes are further added. There is provided the microscopic positioning device of a fourth embodiment, which is capable of carrying out coarse adjustment in the X-axis and Y-axis directions in addition to the six-axis fine adjustment. Two micrometers 31 and 32 are fixed to a coarse adjustment base member 30 to displace the base member 10 of the six-axis microscopic positioning device. The micrometers 31 and 32 have a stroke of several millimeters and are capable of performing the positioning with several micron resolution, thereby being utilized as coarse adjustment axes. After the X-axis and Y-axis directions are roughly positioned by means of the micrometers 31 and 32, an error left to be corrected is compensated by the six-axis microscopic positioning device. As already stated, the machine rigidity is decreased if the degree of freedom in the positioning is increased. Deterioration of rigidity resulting from the addition of the coarse adjustment axes, however, can be averted by coupling the base member 10 and the coarse adjustment base member 30 with bolts through bolt apertures 33 provided in the coarse adjustment base member 30 and the base member 10 of the six-axis microscopic positioning device after moving the movable member 20 by the coarse adjustment.

Although in FIG. 6, the micrometers are only two axes, namely X axis and Y axis, more micrometers may be used to increase coarse adjustment axes. In this case again, however, the coarse adjustment mechanism needs to be fixed with bolts after performing the coarse adjustment for fear that the coarse adjustment axes reduce the rigidity.

Figure 7:
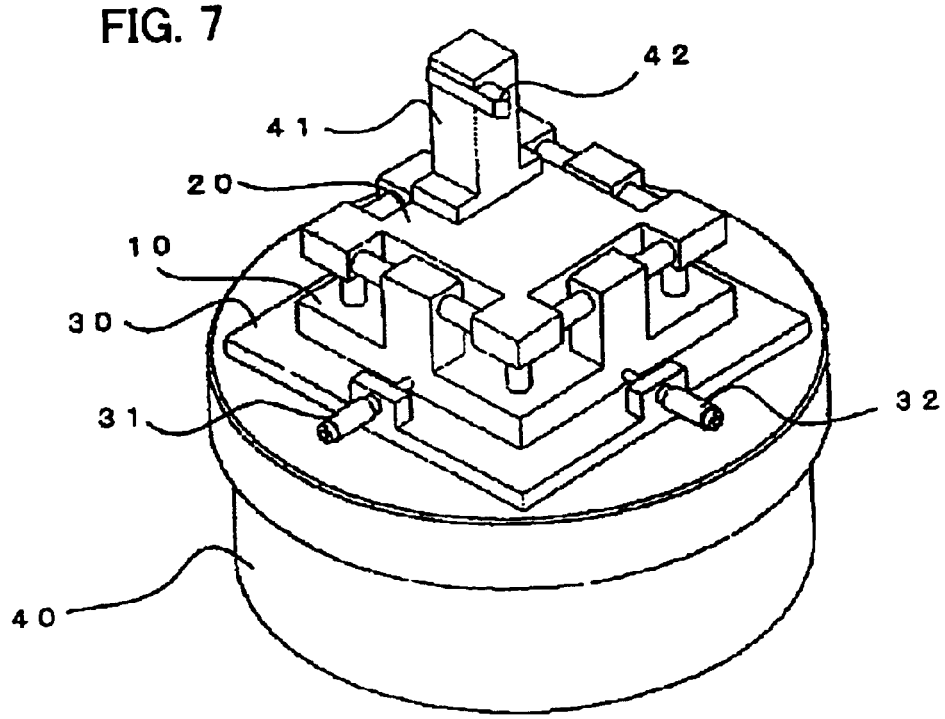
FIG. 7 is a schematic view of a fifth embodiment of the present invention.

FIG. 7 is a schematic view of a fifth embodiment of the present invention. In this embodiment, a microscopic positioning device having 2-axis coarse adjustment positioning means illustrated in FIG. 6 is fixed onto a rotating table 40. Fixed onto the movable member 20 of the microscopic positioning device is a tool holder 41, and a tool 42 is mounted on the tool holder 41.

Figure 8:
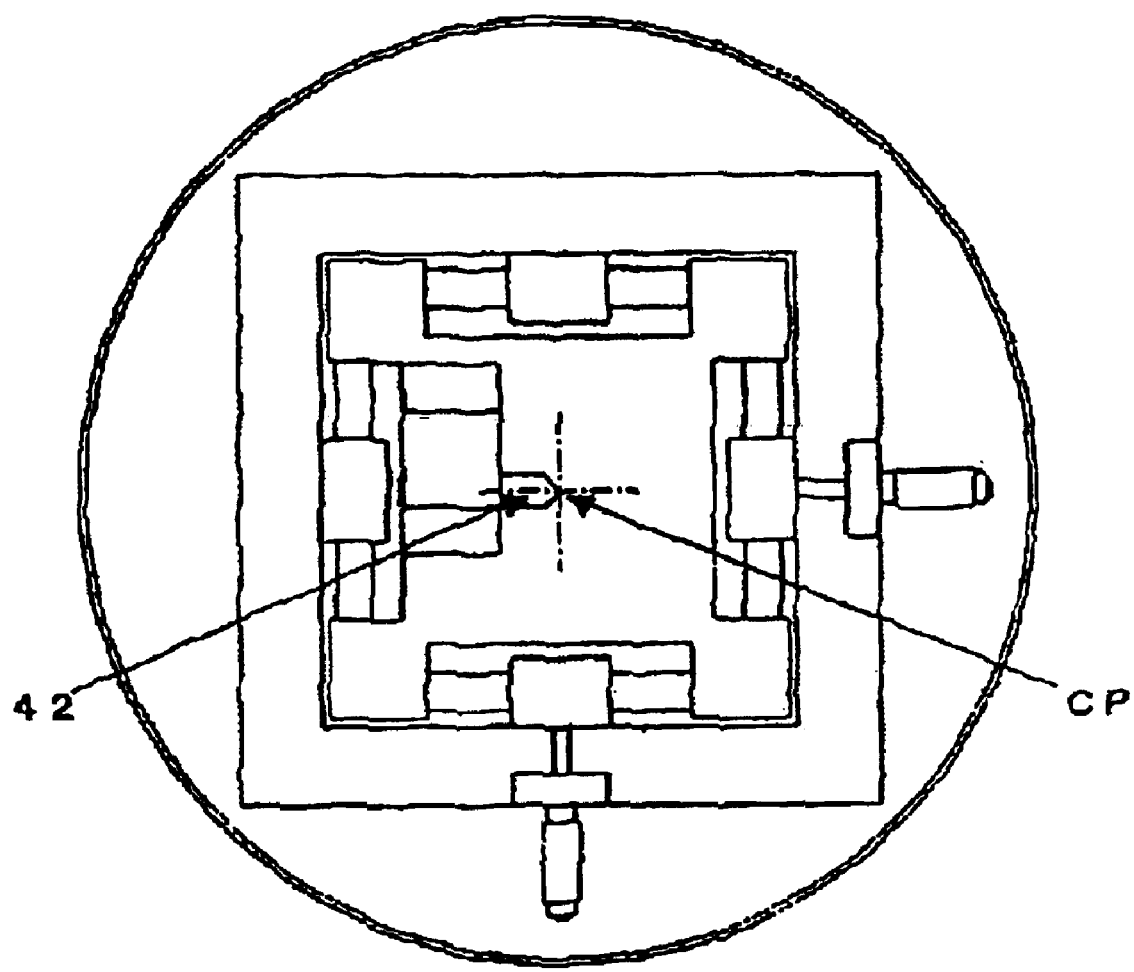
FIG. 8 is an explanatory view of a state where a tool blade edge is made coincide with a rotational center point of a rotating table in the fifth embodiment of the present invention.
Figure 9:
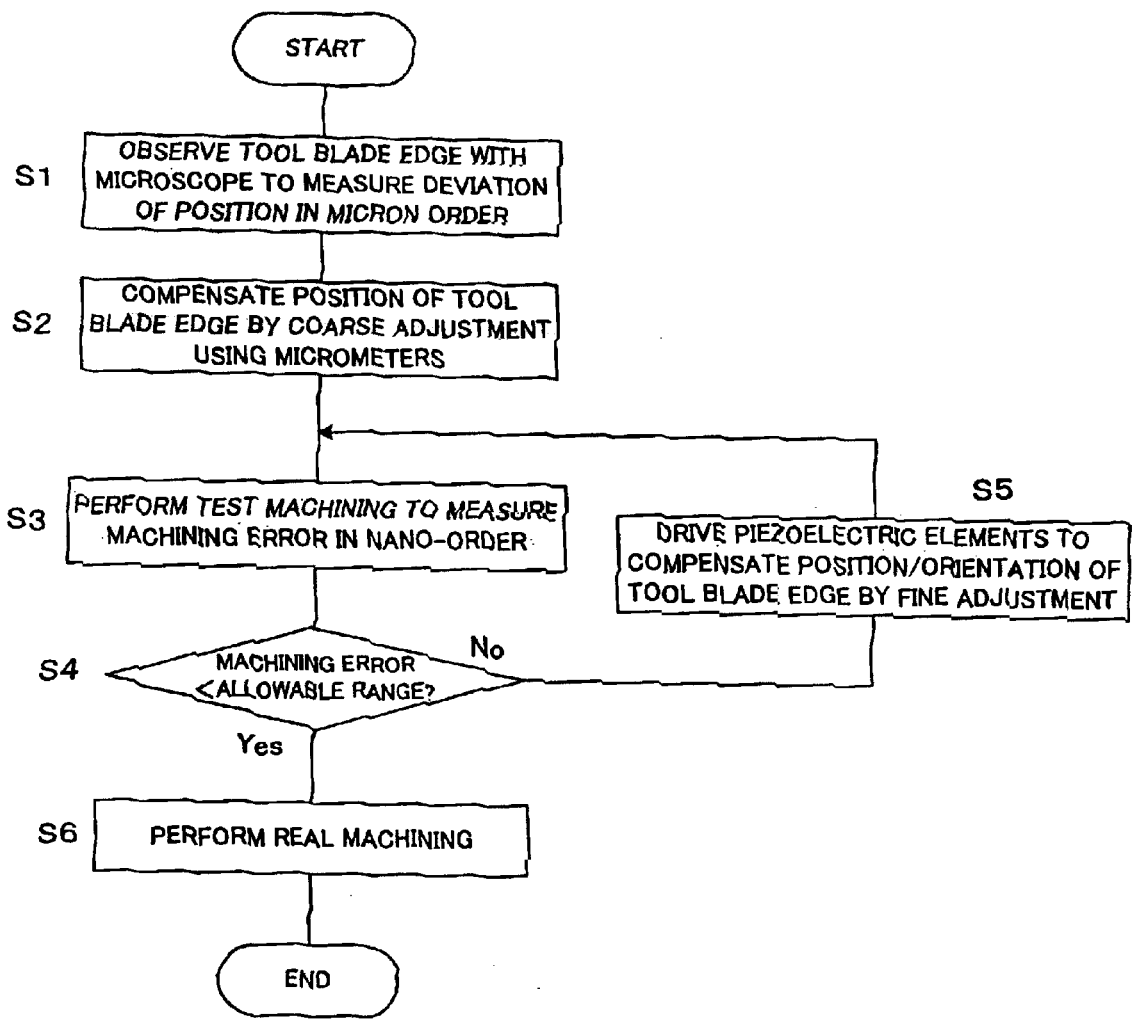
FIG. 9 is a flowchart showing an operation process of making the tool blade edge coincide with the rotational center point of the rotating table in the fifth embodiment of the present invention.

For instance, in the machining of a free-form surface, it is necessary in many cases that a tip end of a blade edge of the tool 42 should not move even if a tool angle is changed by the rotating table 40. To this end, a rotational center point CP of the rotating table 40 is required to coincide accurately with the tip end of the blade edge of the tool 42. FIG. 8 shows the fifth embodiment in FIG. 7 viewed from above. In order to make the blade edge of the tool 42 coincide with the rotational center point CP, the coarse adjustment is first made by using the micrometers 31 and 32 to reduce an error to micron order. Thereafter, the piezoelectric elements P11 through P22 are driven to compensate the position of the blade edge till the error is reduced to nano order. For a method of estimating how much and in what direction the blade edge of the tool 42 deviates from the rotational center point, there is a method in which moving distance of the blade edge at the time of rotation of the rotating table 40 is directly observed by microscope or the like. According to this method, only a micron-order error can be found. However, if test machining is actually performed to measure the accuracy of form of a processed object, it is possible to estimate a nano-order error of the blade edge position. As a consequence, means for making the blade edge position coincide with the rotational center point CP includes the steps shown by a flowchart of FIG. 9.

First, the blade edge of the tool 42 is observed by microscope, and the deviation of the position from the rotational center point CP of the rotating table 40 is measured in the micron order (Step S1). Subsequently, the position of the tool blade edge is compensated by making the coarse adjustment for shifting the base member 10 in the X-axis and Y-axis directions using the micrometers 31 and 32. The coarse adjustment reduces the error between the blade edge position of the tool 42 and the rotational center point CP of the rotating table 40 to micron order (Step S2). Thereafter, the test machining is performed to measure a machining error in the nano-order (Step S3).

A judgement is made as to whether the machining error as a result of the measurement is within an allowable range (Step S4). If the error is not within the allowable range, the piezoelectric elements P11 through P22 are driven to compensate the position and orientation of the blade tip end of the tool 42 by carrying out fine adjustment (Step S5). The test machining is performed again to measure the machining error in the nano-order, and to judge whether the machining error is within the allowable range. Thereafter, Steps S3, S4 and S5 are repeatedly performed, and when it is judged that the machining error enters the allowable range, a real machining is performed (Step S6).

The above steps make it possible to make the blade edge coincide with the rotational center point of the rotating table 40 in the nano-order. Although there are various methods for setting the tool 42 depending on the machining method, the device can be used for compensating the tool position and the tool orientation for general purpose because of the capability of performing the precision positioning of six axes.

According to the second, third, and fourth embodiments illustrated in FIGS. 2, 4 and 6, the same movable member 20 is driven in the X-axis and Y-axis directions. It is possible, however, that the movable member is constructed in double layer to have a configuration comprising a first movable member driven by a driving unit composed of two piezoelectric elements which drive the first movable member in the X- (or Y-) axis direction with respect to the base member 10 and a second movable member driven by a driving unit composed of two piezoelectric elements which drive the second movable member in the Y- (or X-) axis direction orthogonal to the shifting direction of the first movable member with respect to the first movable member. In this case, there may be provided guide means for guiding the shift of the first and second movable members. At least in case that a driving unit is provided to each movable member, the guide means for guiding the shift of the first and second movable members are provided to the respective movable members.

According to the microscopic positioning device of the present invention, it is possible to perform the positioning with nano-order resolution with high machine rigidity. Furthermore, using the six-axis microscopic positioning device enables compensation of the position and orientation of the tool blade edge in the nano-order.

What is claimed is:

1. A microscopic positioning device comprising:

a base member having first and second abutting faces;

a movable member having first and second abutting faces; and at least one driving unit for driving said movable member to be positioned with respect to said base member, including a first piezoelectric element and a second piezoelectric element arranged along a straight line on which expanding/shrinking directions thereof are aligned, one end and the other end of said first piezoelectric element in the expanding/shrinking direction being fixed to the first abutting faces of said base member and said movable member, respectively, and one end of said second piezoelectric element in the expanding/shrinking direction being fixed to one of the second abutting faces of said base member and said movable member, and the other end of said second piezoelectric element being confronting the other of the second abutting faces of said base member and said movable member with a gap in between in unenergized states of said first and second piezoelectric elements.

2. A microscopic positioning device according to claim 1, wherein one or more driving units are provided for one of perpendicular directions such that the straight lines on which the expanding/shrinking directions of the piezoelectric elements of respective driving units are aligned extend perpendicular to each other, so that said movable member is driven with respect to said base member in the perpendicular directions.

3. A microscopic positioning device according to claim 1, wherein four driving units are provided along four sides of a rectangle to drive and position a single movable member with respect to a single base member.

4. A microscopic positioning device according to claim 3, further comprising an additional piezoelectric element disposed at each of four corners of the rectangle, wherein an expanding/shrinking direction of the additional piezoelectric element extends in a direction perpendicular to a plane of the rectangle, and one end and the other end of said additional piezoelectric element are fixed to said base member and said movable member, respectively.

5. A microscopic positioning device according to claim 1, further comprising a micrometer for performing a coarse positioning of said base member along a coarse adjustment axis in the same direction as the expanding/shrinking directions of the piezoelectric elements of at least one of said driving units.

6. A method of compensating a position and/or an orientation of a blade edge of a tool in a nano-order using a microscopic positioning device comprising:

a base member having first and second abutting faces;

a movable member having first and second abutting faces;

at least one driving unit for driving said movable member to be positioned with respect to said base member, including a first piezoelectric element and a second piezoelectric element arranged along a straight line on which expanding/shrinking directions thereof are aligned, one end and the other end of said first piezoelectric element in the expanding/shrinking direction being fixed to the first abutting faces of said base member and said movable member, respectively, and one end of said second piezoelectric element in the expanding/shrinking direction being fixed to one of the second abutting faces of said base member and said movable member, and the other end of said second piezoelectric element being confronting the other of the second abutting faces of said base member and said movable member with a predetermined gap in between in unenergized states of said first and second piezoelectric elements.

* * * * *

UNITED STATES PATENT AND TRADEMARK OFFICE
CERTIFICATE OF CORRECTION

PATENT NO. : 6,920,696 B2
APPLICATION NO. : 10/853140
DATED : July 26, 2005
INVENTOR(S) : Kiyoshi Sawada et al.

Page 1 of 1

It is certified that error appears in the above-identified patent and that said Letters Patent is hereby corrected as shown below:

Col. 4, line 62, delete the "movable" the second occurrence

Col. 7, line 8, change "a13=a14=a17=a 18=a/2" to-- a13=a14=a17=a18=a/2--

Col. 9, line 66, change "nano order" to --nano-order--

Signed and Sealed this

Thirteenth Day of March, 2007

JON W. DUDAS
*Director of the United States Patent and Trademark Office*